W. E. CANE.
BALL BEARING.
APPLICATION FILED MAR. 13, 1908.
906,506.
Patented Dec. 15, 1908.
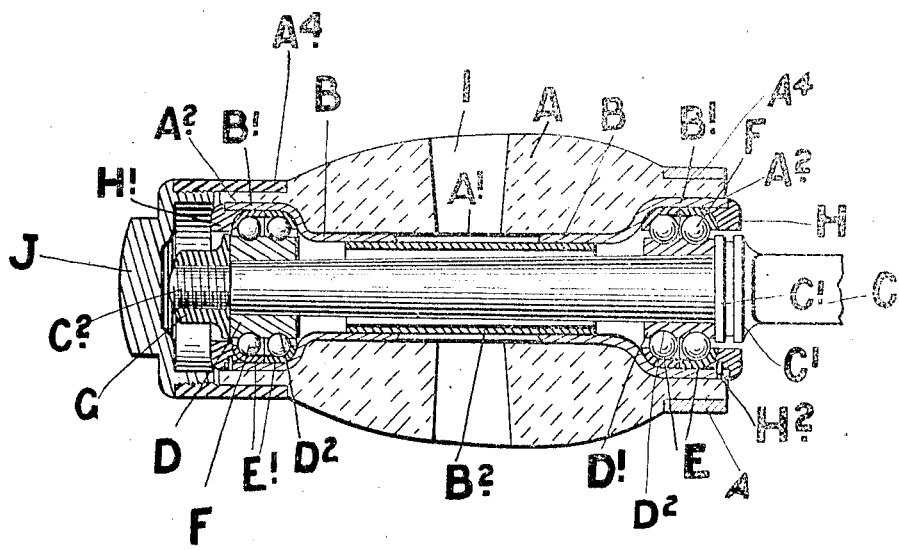
WITNESSES.
INVENTOR.

UNITED STATES PATENT OFFICE.

WILLIAM ETHELBERT CANE, OF TORONTO, ONTARIO, CANADA, ASSIGNOR TO CHAPMAN DOUBLE BALL BEARING COMPANY, OF CANADA, LIMITED, OF TORONTO, CANADA, A CORPORATION.

BALL-BEARING.

No. 906,506.

Specification of Letters Patent.

Patented Dec. 15, 1908.

Application filed March 19, 1908. Serial No. 422,178.

*To all whom it may concern:*

Be it known that I, WILLIAM ETHELBERT CANE, of the city of Toronto, in the county of York, in the Province of Ontario, Canada, have invented certain new and useful Improvements in Ball-Bearings, of which the following is a specification.

My invention relates to improvements in ball bearings more particularly adapted to vehicle wheels, and the object of the invention is to devise a ball bearing of a maximum load and capacity for a minimum diameter of housing.

A further object is to so construct the bearing that no adjusting is necessary and the housing or hub of the wheel may be removed without disturbing the essential elements of the bearing.

My invention consists of a ring surrounding each end of the axle arm and each provided with two grooves, two sets of balls located one in each groove of each ring, divided cups with which the periphery of the balls contact, end sleeves within which the cups fit, a connecting sleeve between the end sleeves and end retaining rings fitting within the ends of the sleeves, the sleeves fitting within the hub suitably bored and the parts being otherwise constructed and arranged as hereinafter more particularly explained.

The drawing represents a sectional view showing my improved ball bearing.

A is the hub of the vehicle wheel, which is provided with a central bore A' having enlargements $A^2$ at each end.

B B are sleeves, which have enlarged outer ends B' to fit the enlargements $A^2$. The sleeves extend inwardly into the bore A'.

$B^2$ is a connecting sleeve fitting within the sleeves B B.

C is the axle arm having the inner flanges C' and the reduced screw-threaded outer end $C^2$.

D and D' are ball rings each having two annular grooves $D^2$ $D^2$ forming race-ways for the inner contact of the balls. The rings D and D' are internally tapered to fit the axle arm.

E are the inner cups and E' are the outer cups between which and the grooves $D^2$ the balls F F rotate and have bearings.

G is the end nut, which is screwed on to the threaded end $C^2$ of the axle arm, and H H' the inner and outer end cap rings which fit respectively outside the flange of the nut G and the flanges C' and serve to retain the cups E and E' in position. The rings H and H' are held in position by suitable pins $H^2$ or other fastening.

I are the spoke holes of the hub and J the end cap of the hub, which fits within the band $A^4$ surrounding the outer end of the hub.

A bearing constructed as I have described gives a maximum load capacity for a minimum size or diameter of housing, which is the object I desire to attain.

What I claim as my invention is:

A hub having a central recess having its ends enlarged, a sleeve having an enlarged end seated in each of the enlarged portions of the recess, the small end of each sleeve extending into the recess, a central sleeve in the recess engaging with the inner ends of the beforementioned sleeves, an axle passing through the said recess and sleeve, grooved rings surrounding the axle at each end of the hub, cups surrounding each ring and having their outer circumference bearing against the enlarged portions of the sleeves, balls placed between the cups and the rings, retaining rings engaging with the outer edges of the cups and with the outer ends of the enlarged portion of the sleeves and pins securing said retaining means to the sleeves.

WILLIAM ETHELBERT CANE.

Witnesses:
   B. BOYD,
   R. COBAIN.